United States Patent
Kang et al.

(10) Patent No.: US 6,713,920 B2
(45) Date of Patent: Mar. 30, 2004

(54) LINEAR ACTUATOR USING TWO ROTORS

(75) Inventors: Ji-yoon Kang, Seoul (KR); Woo-sup Han, Kyungki-do (KR); Jun-o Kim, Kyungki-do (KR); Yong-kyu Byun, Kyungki-do (KR); Kyu-yong Kim, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/143,942

(22) Filed: May 14, 2002

(65) Prior Publication Data
US 2003/0006653 A1 Jan. 9, 2003

(30) Foreign Application Priority Data
Jul. 6, 2001 (KR) ........................................ 2001-40483

(51) Int. Cl.⁷ .................. H02K 16/00; H02K 16/02; H02K 41/00; F16H 25/14; F16H 19/04
(52) U.S. Cl. .................. 310/114; 310/12; 310/20; 310/37; 310/112; 310/80; 74/22 A; 74/22 R
(58) Field of Search .................. 310/20, 37, 80, 310/99, 112, 114, 118, 12; 74/20–25, 29, 32–35, 84 R, 88

(56) References Cited

U.S. PATENT DOCUMENTS

| | | | | | |
|---|---|---|---|---|---|
| 3,194,032 A | * | 7/1965 | Von Brimer | ........... | 310/13 |
| 3,215,206 A | * | 11/1965 | Crow | ........... | 166/120 |
| 3,790,833 A | * | 2/1974 | Hasebe | ........... | 310/162 |
| 3,855,487 A | * | 12/1974 | Boisseau | ........... | 74/25 |
| 3,948,936 A | * | 4/1976 | Cross et al. | ........... | 548/356.1 |
| 4,249,453 A | * | 2/1981 | Riggs et al. | ........... | 91/59 |
| 4,311,080 A | * | 1/1982 | Leonard | ........... | 310/13 |
| 4,352,299 A | * | 10/1982 | Riggs et al. | ........... | 74/84 R |
| 4,391,574 A | * | 7/1983 | Medel et al. | ........... | 418/195 |
| 4,767,958 A | * | 8/1988 | Sasaki | ........... | 310/257 |
| 4,866,458 A | * | 9/1989 | Kimura | ........... | 343/903 |
| 4,932,276 A | * | 6/1990 | Treadwell et al. | ........... | 74/29 |
| 5,159,846 A | * | 11/1992 | Warner | ........... | 74/69 |
| 5,836,205 A | * | 11/1998 | Meyer | ........... | 74/89.17 |
| 6,075,298 A | * | 6/2000 | Maue et al. | ........... | 310/12 |
| 6,081,051 A | * | 6/2000 | Kitazawa et al. | ........... | 310/12 |
| 6,137,195 A | * | 10/2000 | Chitayat | ........... | 310/12 |
| 6,324,872 B1 | * | 12/2001 | Blaszyk et al. | ........... | 65/504 |
| 6,343,522 B1 | * | 2/2002 | Hori et al. | ........... | 74/422 |
| 6,349,679 B1 | * | 2/2002 | Mashimo et al. | ........... | 123/18 R |
| 6,392,322 B1 | * | 5/2002 | Mares et al. | ........... | 310/12 |
| 6,439,104 B1 | * | 8/2002 | Tonogai et al. | ........... | 74/29 |
| 6,474,287 B2 | * | 11/2002 | Babington | ........... | 74/25 |

FOREIGN PATENT DOCUMENTS

| | | |
|---|---|---|
| JP | 55-93570 A | 7/1980 |
| JP | 59-171007 A | 9/1984 |

* cited by examiner

Primary Examiner—Burton S. Mullins
Assistant Examiner—J. Aguirrechea
(74) Attorney, Agent, or Firm—Burns Doane Swecker & Mathis, LLP

(57) ABSTRACT

A linear actuator capable of inducing a linear motion as well as a rotational motion using only two rotors is provided. The linear actuator includes: first and second rotors connected to respective driving force sources; a linear motion unit formed on the first rotor to be linearly movable; and a driving power transmission unit which is fixed to the second rotor and engages the linear motion unit. A linear motion on a rotor can be easily induced using a relative angular velocity difference between two rotors without an additional driving power source for the linear motion.

10 Claims, 2 Drawing Sheets

LINEAR ACTUATOR USING TWO ROTORS

Priority is claimed to Patent Application Number 2001-40483 filed in Rep. Korea on Jul. 6, 2001, herein incorporated by reference.

BACKGROUND OF THE INVENTION

1. Field of the Invention

The present invention relates to linear actuators, and more particularly, to a linear actuator capable of inducing a linear motion on a rotor using an angular velocity difference between two rotors.

2. Description of the Related Art

In general, a conventional rotating body needs a linear motor around the rotary shaft of a rotor for linear motion. This linear motor is powered via a power supply path by an external power source. However, such a conventional rotating body suffers from problems in supplying power to the linear motor positioned on the rotor.

A brush is needed to supply power to such a linear motor. However, due to brush wear and damage, the lifetime is shortened, and the waveform of a supply power becomes unstable, increasing the likelihood of noise and vibration occurring when applied to a precise device. Also, the structure using a brush adds complexity to the structure of a product and increases the cost of manufacturing.

A wireless power transmission technique has been considered. However, this wireless technique has a problem of very low transmission rate. In particular, when applied to a storage device or miniature device that is sensitive to external electric fields, the design itself is complicated, and operational efficiency can be remarkably reduced.

SUMMARY OF THE INVENTION

To solve the above-described problems, it is an object of the present invention to provide a linear actuator capable of inducing a linear motion on a rotor with a simple structure without need to mount an additional linear motor as a driving power source on the rotor.

To achieve the object of the present invention, there is provided a linear actuator using two rotors, comprising: first and second rotors connected to respective driving force sources; a linear motion unit formed on the first rotor to be linearly movable; and a driving power transmission unit which is fixed to the second rotor and engages the linear motion unit.

It is preferable that the linear motion unit is coupled to the first rotor by a linear bearing such that the linear motion unit can linearly move. It is preferable that the linear motion unit engages the driving power transmission unit and linearly moves due to a relative angular velocity difference between the first and second rotors. It is preferable that the linear motion unit is a rack, and the driving power transmission unit is a pinion. It is preferable that the first and second rotors are controlled by respective spindle motors such that the first and second rotors rotate at different velocities.

In another embodiment of the present invention, a linear actuator is provided that includes a first rotor; a second rotor, wherein said first and second rotors are connected to respective driving force sources; a linear motion unit formed on the first rotor to be linearly movable; and a driving power transmission unit which is fixed to the second rotor and engages the linear motion unit, wherein the linear motion unit moves linearly by engagement with the driving power transmission unit when the first and second rotor differ in angular velocity.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Preferred embodiments of a linear actuator using two motors according to the present invention will be described with reference to appended drawings.

Figure 1:
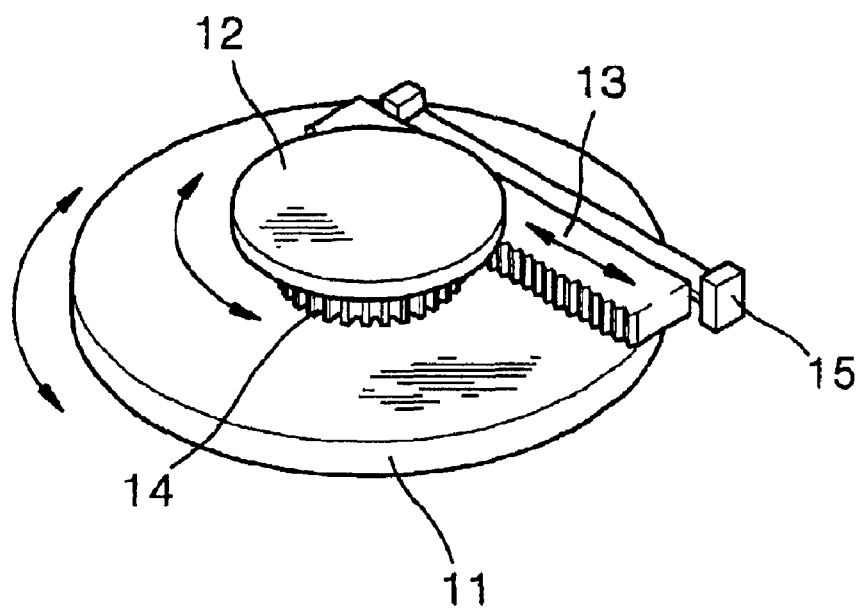
FIG. 1 is a perspective view of a linear actuator using two rotors according to the present invention.

As shown in FIG. 1, the feature of the linear actuator using two motors according to the present invention lies in that linear motion is derived from rotational motion of a rotor without an additional linear motion driving power source.

Two rotors, first and second rotors 11 and 12, are stacked upon one another with respective driving power sources. Functionally, the first rotor 11 can be referred to as a rotary motion body, and the second rotor 12 can be referred to as a linear motion inducer body. A linear motion unit 13, for example, a rack, is formed on the rotary motion body 11. A driving power transmission unit 14, for example, a pinion, is formed on the linear motion inducer body 12 to transmit a linear motion driving force to the linear motion unit 13. The rotary motion body 11 and the linear motion inducer body 12 are connected to the respective driving power sources so that they can independently rotate.

The linear motion unit 13 is not completely fixed to the rotary motion body 11. The linear motion unit 13 is coupled to the rotary motion body 11 by, for example, a linear bearing fixed to the rotary motion body 11 such that it can linearly move with respect to the rotary motion body 11 that rotates.

In contrast, the driving power transmission unit 14 is fixed to the linear motion inducer body 12. As the linear motion unit 13 and the driving power transmission unit 14 engage with each other, the driving power transmission unit 15 can transmit a linear driving power resulting from a relative angular velocity difference between the rotary motion body 11 and the linear motion inducer body 12. Rotary motions of the rotary motion body 11 and the linear motion inducer body 12 are derived by the respective driving power sources including but not limited to motors.

The operation of the linear actuator using two rotors according to the present invention will be described in greater detail with reference to FIG. 1.

As the rotary motion body 11 is rotated by an external driving power source, the linear motion unit 13 coupled to the rotary motion body 11 by a linear bearing 19 (FIG. 2) starts to rotate at the same angular velocity as the rotary motion body 11. In this state, the linear motion unit 13 merely rotates along with the rotary motion body 11 as long as an additional linear motion driving force is applied.

At this time, if the linear motion inducer body 12 is rotated at the same angular velocity in the same direction as the rotary motion body 11, the driving power transmission unit 14 fixed to the linear motion inducer body 12 rotates. As a result, the linear motion unit 13 engaged with the driving power transmission unit 14 merely rotates at the same angular velocity in the same direction.

To induce a linear motion of the linear motion unit 13, the angular velocity of the linear motion inducer body 12 should be different from that of the rotary motion body 11 When the linear motion inducer body 12 and the rotary motion body 11 rotate at different angular velocities, a relative angular velocity difference occurs between the linear motion unit 13 engaged with the driving power transmission unit 14 and the rotary motion body 11 so that the linear motion unit 13 can move in a different manner, separate from the rotation of the rotary motion unit 11. This additional motion of the linear motion unit 13 is induced due to the interaction with the driving power transmission unit 14.

The linear motion of the linear motion unit 13 is controlled by the distance from the axis of rotation to the point of engagement between the linear motion unit 13 and the driving power transmission unit 14, i.e., the diameter of the linear motion inducer body 12. As the point of engagement becomes close to the axis of rotation, the linear motion of the linear motion unit 13 can be precisely controlled.

The linear motion unit 13 linearly moves while rotating. The linear motion unit 13 can be applied to a sensor, a cantilever 15 with a head to read information from an information storage medium, or a micro robot which rotationally and radially moves. The linear motion unit 13 may be a rack.

Figure 2:
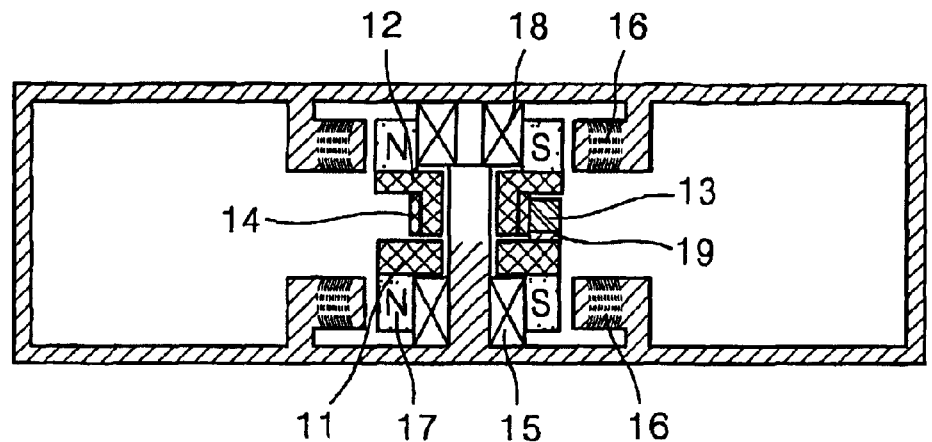
FIG. 2 is a sectional view of a preferred embodiment of the linear actuator using two rotors according to the present invention.

An embodiment of a linear actuator using two rotors according to the present invention will be described with reference to FIG. 2. FIG. 2 is a sectional view of an embodiment of the linear actuator according to the present invention, in which the linear motion unit 13 is formed as a rack between two rotors, the rotary motion body 11 and the linear motion inducer body 12.

The rotary motion body 11 and the linear motion inducer body 12 are rotated by respective driving power sources, such as spindle motors each comprising a coil 16, a magnet 17, and a bearing 18. The linear motion unit 13 and the driving power transmission unit 14 are disposed between the rotary motion body 11 and the linear motion inducer body 12 while being engaged with each other. The linear motion unit 13 is coupled to the rotary motion body 11 by a linear bearing 19 such that it can linearly move as well as rotate. The driving power transmission unit 14 is fixed to the linear motion inducer body 12 and engages the linear motion unit 13.

The two rotors shown in FIG. 2, the rotary motion body 11 and the linear motion inducer body 12, rotate in connection with the respective spindle motors each including the coil 16, the magnet 17, and the bearing 18 As described above, the rotary motion body 11 and the linear motion inducer body 12 rotate with the application of a power. The linear motion unit 13 can linearly move by an angular velocity difference between the rotary motion body 11 and the linear motion inducer body 12.

Figure 3:
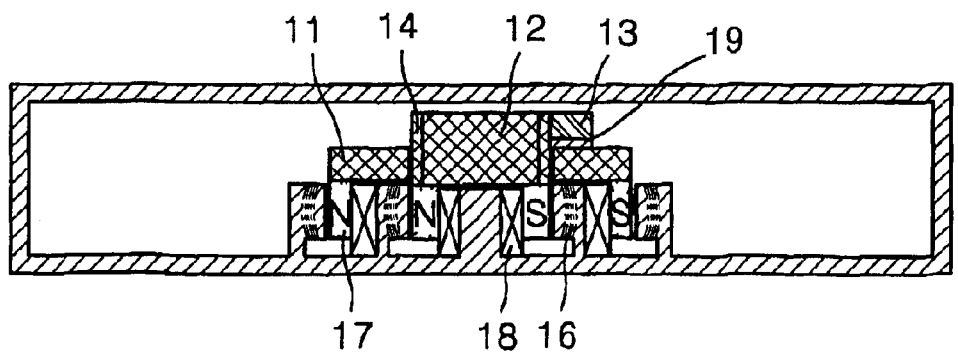
FIG. 3 is a sectional view of another preferred embodiment of the linear actuator using two rotors according to the present invention.

FIG. 3 is a sectional view of another embodiment of the linear actuator using two rotors according to the present invention. In the present embodiment, two rotors 11 and 12 are disposed on the same plane. Driving power sources for the two rotors 11 and 12, for example, spindle motors each including the coil 16, the magnet 17, and the bearing 18, are manufactured in different sizes so that the rotary motion body 11 rotates surrounding the linear motion inducer body 12 on the same plane.

The linear motion unit 13 is formed on the rotary motion body 11 by the linear bearing 19 and engages the driving power transmission unit 14 fixed to the linear motion inducer body 12. The linear motion inducer body 12 may be a rack. The power transmission mechanism to the rack engaged with the driving power transmission unit 14 is the same as in the linear actuator shown in FIG. 2

The embodiment illustrated in FIG. 3 is advantageous in that the overall size of the linear actuator can be reduced, compared to the linear actuator of FIG. 2

According to the present invention, a linear actuator capable of inducing a linear motion on a rotor can be easily implemented using a relative angular velocity difference between two rotors without an additional linear motor connected to an external power source. The linear actuator according to the present invention can reduce the cost of manufacturing and has numerous applications, for example, in the storage media field.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A linear actuator using two rotors, comprising:

first and second rotors connected to respective driving force sources;

a linear motion unit formed on the first rotor to be linearly movable; and a driving power transmission unit which is fixed to the second rotor and engages the linear motion unit.

2. The linear actuator of claim 1, wherein the linear motion unit is coupled to the first rotor by a linear bearing such that the linear motion unit can linearly move.

3. The linear actuator of claim 1, wherein the linear motion unit engages the driving power transmission unit and linearly moves due to a relative angular velocity difference between the first and second rotors.

4. The linear actuator of claim 1, wherein the linear motion unit is a rack, and the driving power transmission unit is a pinion.

5. The linear actuator of claim 1, wherein the first and second rotors are controlled by respective spindle motors such that the first and second rotors rotate at different velocities.

6. A linear actuator, comprising:

a first rotor;

a second rotor, wherein said first and second rotors are connected to respective driving force sources;

a linear motion unit formed on the first rotor to be linearly movable; and a driving power transmission unit which is fixed to the second rotor and engages the linear motion unit, wherein the linear motion unit moves linearly by engagement with the driving power transmission unit when the first and second rotor differ in angular velocity.

7. The linear actuator of claim 6, wherein an axis of rotation of the first rotor is axially aligned with an axis of rotation of the second rotor.

8. The linear actuator of claim 6, wherein the linear motion unit is coupled to the first rotor by a linear bearing such that the linear motion unit can linearly move relative to the first rotor as linear motion unit rotates with said first rotor.

9. The linear actuator of claim 6, wherein the linear motion unit is a rack, and the driving power transmission unit is a pinion.

10. The linear actuator of claim 6, wherein the first and second rotors are controlled by respective spindle motors such that the first and second rotors rotate at different velocities.

* * * * *